Aug. 2, 1932.         O. H. ENSIGN         1,869,805
ART OF FUEL INJECTION FOR INTERNAL COMBUSTION ENGINES
Original Filed Jan. 17, 1927    6 Sheets-Sheet 2

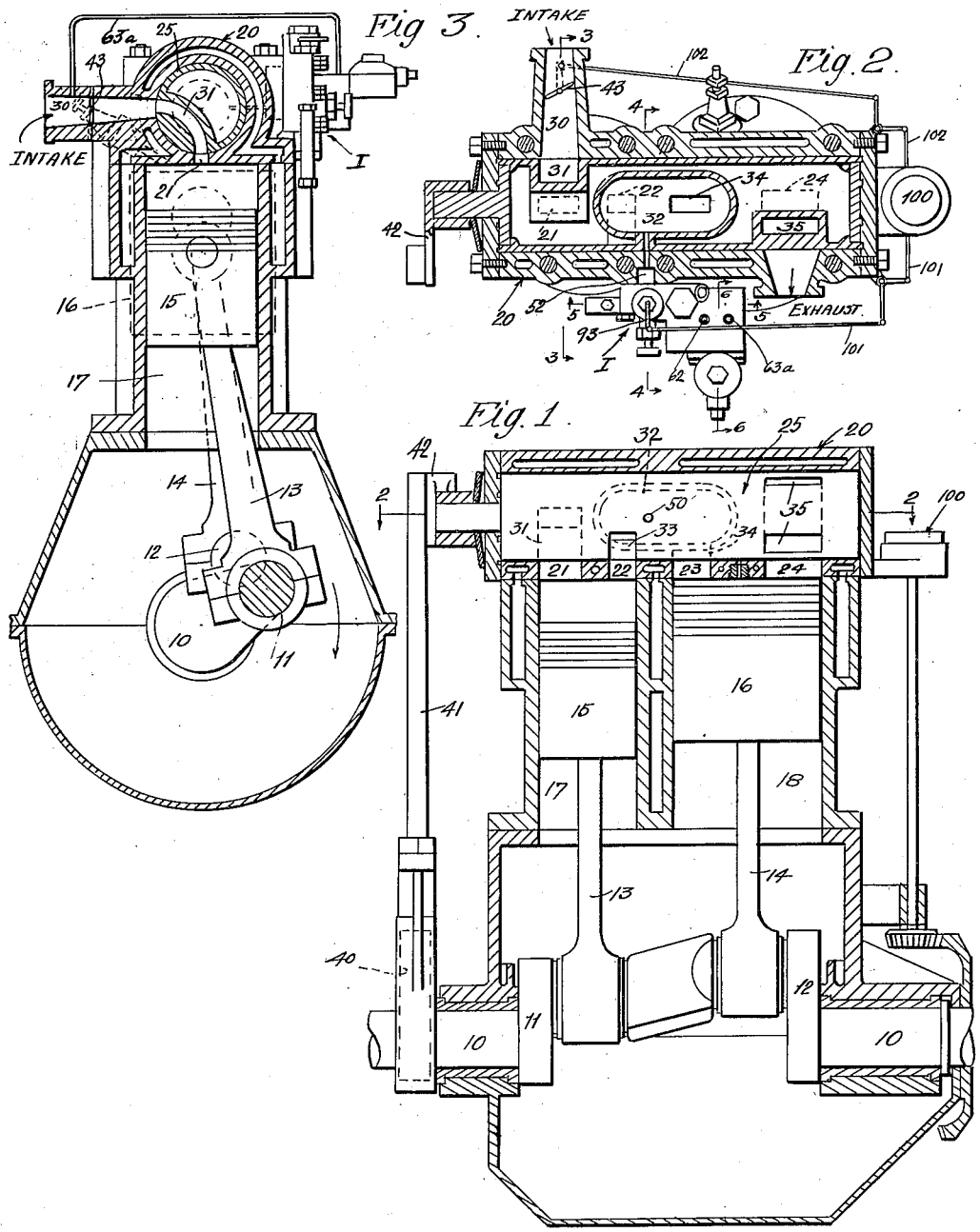

Inventor
Orville H. Ensign

Attorney.

Aug. 2, 1932.  O. H. ENSIGN  1,869,805
ART OF FUEL INJECTION FOR INTERNAL COMBUSTION ENGINES
Original Filed Jan. 17, 1927  6 Sheets-Sheet 4

Inventor
Orville H. Ensign
Attorney.

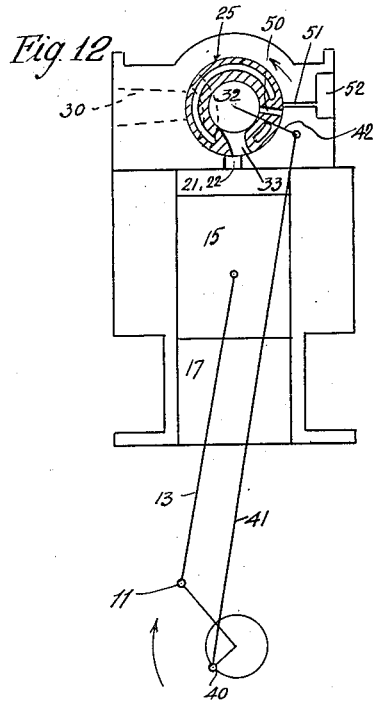
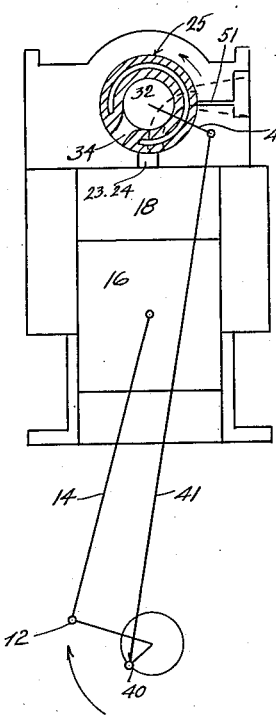
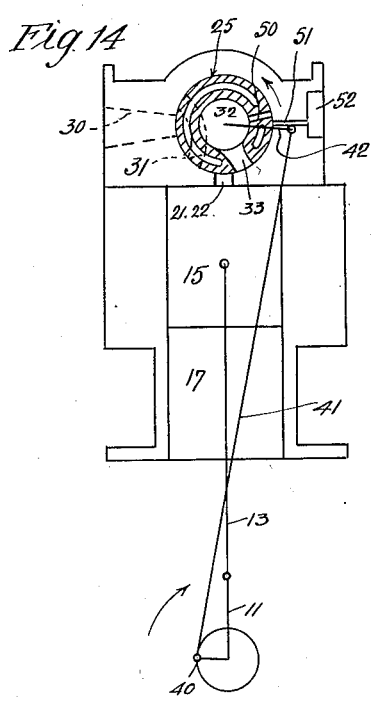
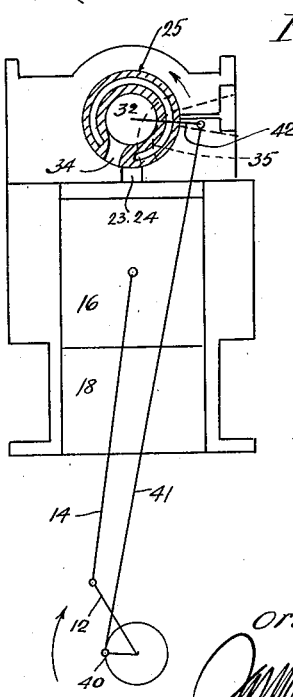

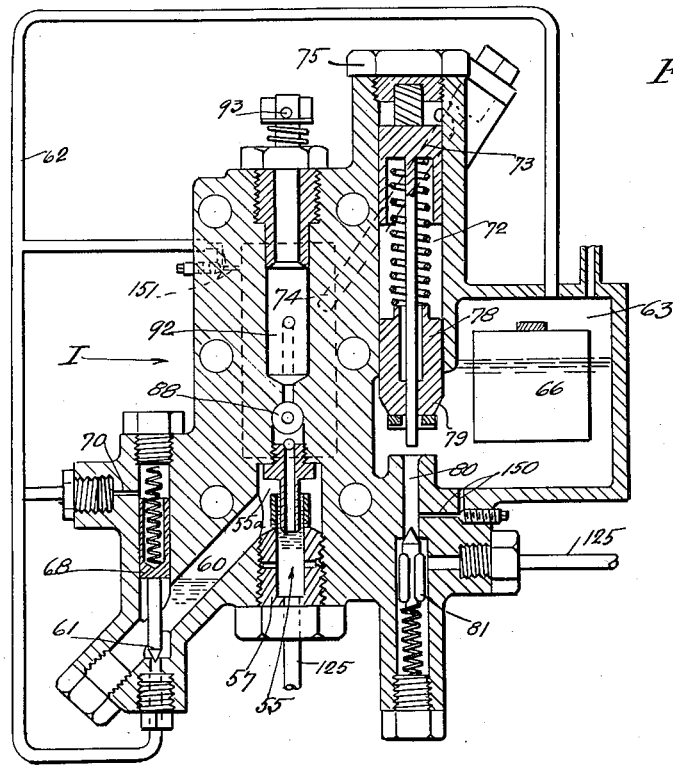

Patented Aug. 2, 1932

1,869,805

UNITED STATES PATENT OFFICE

ORVILLE H. ENSIGN, OF PASADENA, CALIFORNIA, ASSIGNOR TO ENSIGN CARBURETOR CO., LTD., OF HUNTINGTON PARK, CALIFORNIA, A CORPORATION OF CALIFORNIA

ART OF FUEL INJECTION FOR INTERNAL COMBUSTION ENGINES

Application filed January 17, 1927, Serial No. 161,513. Renewed December 29, 1931.

This invention has reference to the injection of fuel for an internal combustion engine; the invention as hereinafter set out comprising a means and method of supplying fuel by injection to an internal combustion engine, also more specifically the combination of such means and method with an engine of the constant volume full expansion type such as set out in my Letters Patent No. 1,536,780, May 5, 1925, and also in the method of operation of such an engine equipped with such fuel injection. The invention thus has various aspects, all of which will be understood from the following descriptive matter wherein I set forth more or less specifically the combination of my system of injection with the type of engine referred to. It will be understood, however, that the invention is not necessarily limited to injection as applied to the specifically described type of engine, but may be generally applicable to other types.

To describe my invention preliminarily in a general way, I may say that it comprises a means and method whereby a gaseous charge (for instance air or a mixture of air and gaseous fuel, and which I hereinafter term the injection charge) is charged into a chamber by the operation of the engine at comparatively high pressure at a certain point in the engine cycle. At another certain point in the engine cycle this isolated injection charge is released into a subsequent air charge then being compressed by the engine and at a time when that subsequent charge is at a relatively low pressure. The movement of this isolated injection charge, upon its release, is made use of to draw or inject into the air charge then being compressed a certain metered amount of fuel to form a combustible mixture. Suitable valve action takes care of the isolation of the injection charge and of its redelivery into the air charge being subsequently compressed.

In the broader aspects of my invention it may be considered that in any internal combustion engine successive gaseous (air or air and gaseous fuel) charges are compressed; and thus in a broad aspect of my invention the means and method, with proper valvular control, are applicable to any internal combustion engine. However, I prefer to illustrate my invention typically in connection and combination with the type of engine hereinbefore referred to, as in that type of engine there are certain valvular controls to which the valvular control of my injection system may be very easily applied; and further because the complete combination, both as regards apparatus and method, has certain peculiar advantages which will be pointed out hereinafter. The type of engine set forth in my previously issued patent, and also set forth in improved form in my application Serial Number 146,635, filed November 6, 1926, entitled Internal combustion engines, involves an engine unit comprising a compression cylinder and a work cylinder, which are interconnected through the medium of a transfer and valvular element into which the compressed charge from the compression cylinder is stored at high pressure and isolated temporarily between the two cylinders, the mechanism subsequently transferring the isolated charge to the work cylinder and the chamber of the transfer element becoming a firing chamber while in communication with the work cylinder. Owing to the peculiar arrangement and operation of this transfer and valvular element it is possible in an engine of the type described to compress a charge to a comparatively high pressure and then, because the size of the work cylinder is not determined by, or determinative of, the volume of the charge or its degree of compression, to expand the burning charge fully to atmospheric pressure. During the period of charge compression in the compressing cylinder the chamber of the transfer element is open to that cylinder, so that the pressure in the chamber of the transfer element rises from substantially atmospheric to a relatively high compression pressure. When the charge is fully compressed the chamber in the transfer element is cut off from the compressing cylinder and is then shortly thereafter put into communication with the work cylinder and the charge fired and expanded. The transfer and valvular action of an engine of the type described thus lends itself very readily to the operation of my injection system because, as will be seen from the following description, a part of the charge in the transfer element may be taken off by a very simple valvular control into what I will term an injection charge chamber; and then by the same simple valvular control the previously isolated injection charge, standing at high pressure, may be released into the chamber of the transfer element and into the next subsequent air charge at a time when that subsequent charge is at a comparatively low pressure; drawing in or injecting with it the metered quantity of fuel necessary for making a combustible or explosive charge.

The invention also comprises, as will be hereinafter pointed out, certain features, combinations and details of the injection system per se, particularly with regard to its provisions for feeding the fuel by reason of release and movement of the gaseous injection charge, and also in its provisions for obtaining metered quantities of fuel under either constant or varying operating conditions.

In the accompanying drawings:

Fig. 1 is a longitudinal vertical section showing an engine of the type herein referred to;

Fig. 2 is a horizontal section taken on line 2—2 of Fig. 1; and showing the engine equipped with my injection system;

Fig. 3 is a vertical cross section taken as indicated by line 3—3 on Fig. 2,

Figure 4:
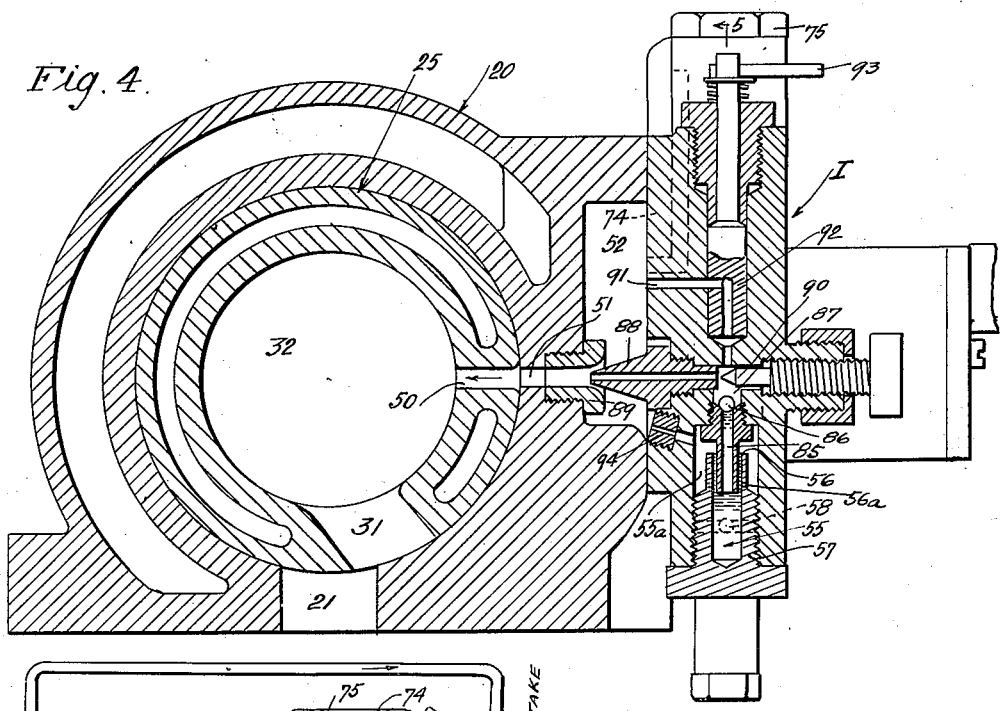
Fig. 4 is an enlarged vertical detail section taken as indicated by line 4—4 on Fig. 2.

Figs. 8 and 9, 10 and 11, 12 and 13 and 14 and 15 are diagrams, in pairs, illustrating successive positions of the engine and its valvular control;

Fig. 16 is a view similar to Fig. 4, showing another variant form of injection device applicable to a multiple-cylinder engine; and Fig. 17 is a diagram showing the application of the device of Fig. 16 to a multiple-cylinder engine.

For the purpose of making clear the application of my injection system to the particular type of engine here described, and thereby making clear the application of the injection system to internal combustion engines in general, I shall first describe briefly the construction and operation of the particular type of engine here referred to. First I shall describe only an engine of a single unit, as a single unit typifies the operation of the complete engine, and the injection system is applicable to a single engine unit, although as I point out hereinafter, there are some details of operation that may be best applicable to an engine of two or more units. It will be understood that the engine itself, apart from the injection system, is the subject matter of, and claimed in, the patent and application above spoken of.

In Figs. 1 to 3 I show a typical engine, which has a crank shaft 10 with two cranks 11 and 12 connected respectively by connecting rods 13 and 14 to compression piston 15 and work piston 16 reciprocating respectively in compression cylinder 17 and work cylinder 18. Crank throw 11 of the compression cylinder is arranged about 30° ahead of crank 12 of the work cylinder, in order to obtain the cyclic sequences hereinafter explained.

The heads of the two cylinders may conveniently be formed by the lower part of cylindric valve casing 20, and in these cylinder heads there are ports which lead to the interior of the valve casing. Compression cylinder 17 has an initial intake port 21 and a transfer port 22; the work cylinder has a firing port 23 and an exhaust port 24; all of these ports being controlled by the single cylindric oscillating valve 25 located in valve casing 20. Of details of structure of the valve and its casing I need not here speak at length, those details being set out in my prior application. I shall here describe only sufficient of the valve structure and its operation to show how my injection system is combined with an engine of this type.

The valve casing 20 has an initial intake port 30; and at certain periods of the cycle of operations a passage 31 in valve 25 registers with ports 30 and 21. Inside the cylindric valve there is a combustion chamber 32; the valve port 33 leads to this chamber 32 and is adapted at certain times to register with transfer port 22. And a port 34 leading from combustion chamber 32 is adapted at certain other times to register with firing port 23 of the work cylinder 18. The valve 25 also contains an exhaust passage 35 which at certain times registers with exhaust port 24 of the work cylinder. Valve 25 is oscillated from an eccentric 40 on crank shaft 10, through the medium of a connecting link 41 and an arm 42. These parts are shown in structure in Fig. 1 and diagrammatically in Figs. 8 and following:

In the position of the parts shown in Fig. 3, with the compression piston 15 on its down stroke, intake passage 31 of valve 25 is in communication with initial intake port 30 and with the compression cylinder intake port 21, allowing the gaseous charge (in this case a charge of air) to be drawn in under control of a throttle 43. Just prior to the position of Fig. 3, and when compression piston 15 was at the top of its stroke (see Fig. 14) the passage 31 of the valve was out of communication with port 21, but, with the valve moving in the direction indicated in Fig. 14 as the piston moves down, port 31 comes into communication with port 21 at the point denoted $a$ in Fig. 7. Thereafter as the compression piston moves on down to the bottom of its stroke, the valve 25 moves on around in the direction indicated by the arrow in Fig. 14 and then moves back again in the opposite direction, so that when the piston 15 reaches the bottom of its stroke the valve passage 31 just cuts off from port 21, at the point marked $b$ in Fig. 7. In the diagram of Fig. 8 piston 15 is shown just past its lowermost point and intake passage 31 is shown just past its point of cut-off from intake port 21. At a time immediately after the intake passage 31 cuts off from port 21, and at about the time piston 15 reaches the position shown in Fig. 8, valve port 33 begins to communicate with transfer port 22, the point of beginning of that communication being designated $c$ in Fig. 7. As piston 15 moves on up on its compression stroke, as indicated successively in the diagram of Figs. 8, 10, 12 and 14, it will be seen that the valve movements keep port 33 in communication with port 22, the valve at first traveling in the directions indicated by the arrows in Figs. 8 and 10 and then beginning to travel in the opposite direction, as indicated in Figs. 12 and 14, port 33 finally cutting off from port 22 just about as piston 15 reaches its uppermost point, or at the point designated $d$ in Fig. 7. The compressed charge of air is thus completely put into the valve chamber 32 and isolated therein at high pressure, none, or practically none, of the charge being left in the compressing cylinder as that cylinder has no clearance.

Figure 9:
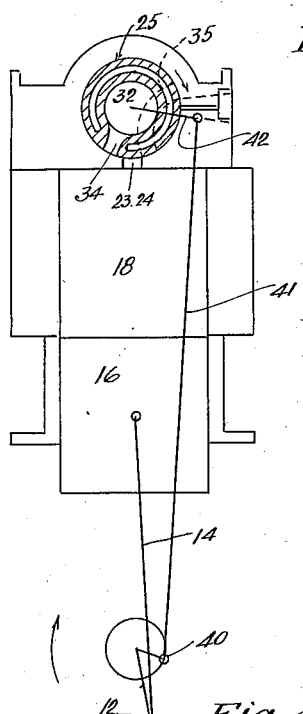
Figure 10:
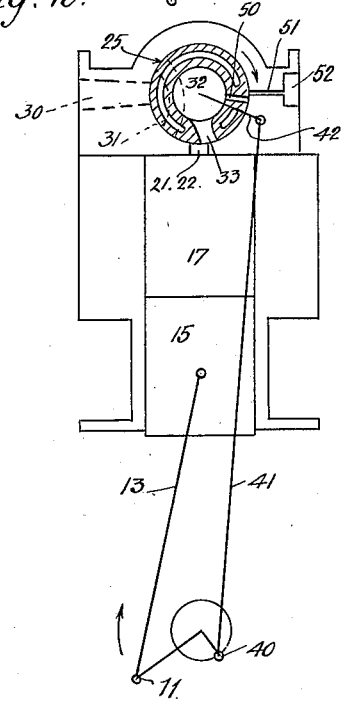
Figure 11:
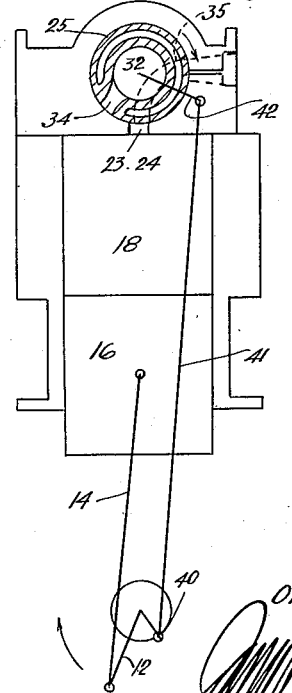

Immediately after the compression piston reaches its uppermost point and the charge has been compressed fully into chamber 32 that compressed charge is then put into communication with the work cylinder by way of ports 34 and 23. The beginning of this communication starts at the point designated $e$ in the diagram of Fig. 7 somewhat before the work piston 16 reaches its uppermost point. In Fig. 15 (which corresponds to Fig. 14) the work piston 16 is shown approaching its uppermost position. In this position of the parts the valve 25 is moving in the direction indicated by the arrow and the valve port 34 is just about to begin communication with the cylinder firing port 23. Then as piston 16 moves on up and then starts down, the valve 25 having moved around in the direction indicated from the position shown in Fig. 15, the communication of ports 34 and 23 becomes wide open, and then finally as the work piston 16 nears the bottom of its stroke, as shown in Fig. 9, the valve 25 then moving in the opposite direction, port 34 is cut off from port 23, the point of this cut-off being indicated $f$ in the diagram of Fig. 7.

Figure 7:
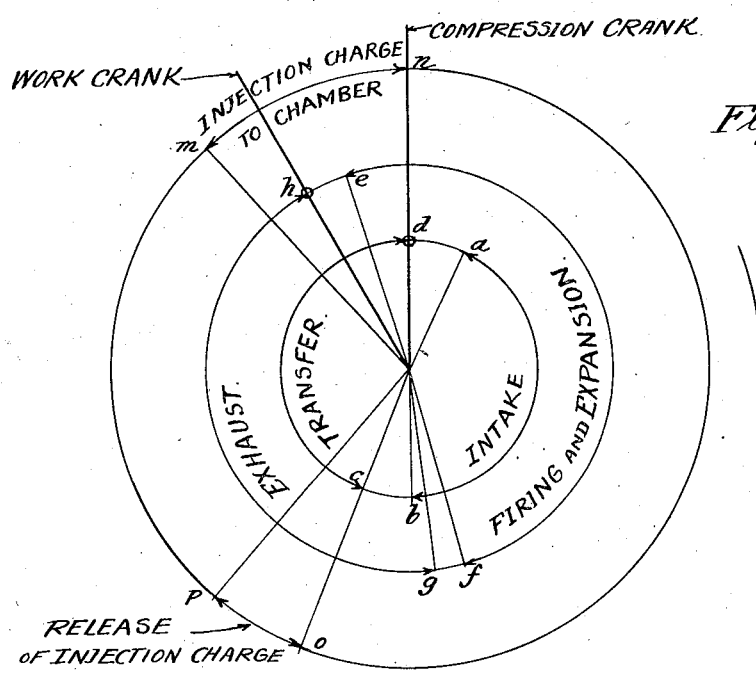
Fig. 7 is a diagram illustrating the cyclic operation of the engine.
Figure 8:
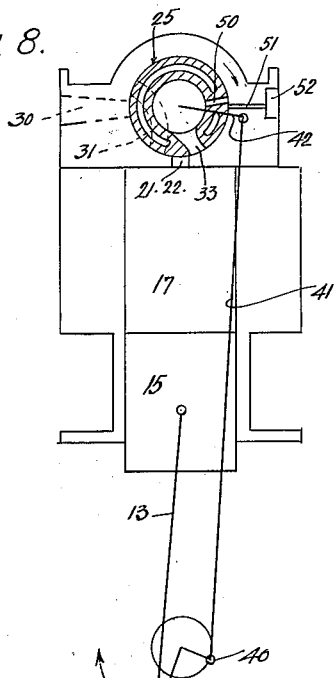

The charge is fired in cylinder 18 and in valve chamber 32 at the time that valve chamber is first opened to communication with the work cylinder, firing taking place substantially at the point marked $e$ in Fig. 7. The whole charge contained in both the work cylinder and valve chamber 32 is burned and expanded during the downward stroke of piston 16, chamber 32 remaining open to the work cylinder during substantially the whole of the downward stroke of piston 16, finally cutting off from that communication at the point $f$ in Fig. 7, somewhat before the valve next registers its port 33 with transfer port 22 for the compression piston to compress a new charge through the transfer port into the valve chamber 32.

Just as the work cylinder reaches the bottom of its stroke (see Fig. 9) the valve exhaust port 35 comes into communication with cylinder exhaust port 24. The beginning of this communication can be understood from a consideration of Fig. 9; the point at which the exhaust opens is designated $g$ in Fig. 7. The exhaust then remains open during the up-stroke of work piston 16 (see Figs. 11 and 13) and closes at the point designated $h$ in Fig. 7. This point is approximately at the position of Fig. 15 where, with the valve oscillating in the direction indicated by the arrow, the exhaust passage 35 in the valve will be seen to have just cut off from the cylinder exhaust port 24.

From the foregoing description it will be seen that the charge compressed in cylinder 17 is compressed into valve chamber 32 during the upstroke of the compressor piston and then, after a very short isolation in that chamber, is communicated to the work cylinder, fired and expanded. The diagram of Fig. 7 must be understood in this way: that the point $e$ (the beginning of firing and expansion) is not reached until after the point $d$ (the end of transfer to the valve chamber) is reached; the point $e$ in the diagram being laid off with reference to the work crank which lags behind the compression crank by 30°. Consequently it will be seen that the cycle of operations in the valve chamber 32 comprises substantially a sequence of having a charge compressed in it and then having that compressed charge fired and expanded to substantially atmospheric pressure, and then immediately afterwards receiving the compression of a new charge, and so on. Due to the fact that the transfer to the valve chamber 32 opens at the point $c$ when the compressor piston has just started on its upstroke, the pressure in the chamber 32 starts at substantially atmospheric and rises to the full compression pressure.

Now the general function of the injection system is to take and isolate a certain portion of the highly compressed charge, taking that portion from chamber 32 when the pressure there is high, and to release that portion of the charge back to chamber 32 when the pressure there is comparatively low at the beginning of compression of the next subsequent charge, and to carry and inject with it a certain metered quantity of fuel. The proportionate part of the complete charge that is thus taken as what I term an injection charge is preferably comparatively small; in practice only enough to carry and handle the requisite fuel. To make that injection charge any larger than is necessary for the purpose of injection would be merely to dissipate energy, as the injection charge is taken out of the main body of charge at high pressure and put back into it at a low pressure.

Referring to the diagram of Fig. 7, the functions and timing of the injection system may be broadly explained. At the point designated $m$ (the positions being shown with reference to the compressor crank) the valve mechanism allows a small part of the compressed charge in chamber 32 to escape into the injection charge chamber, the charging of that chamber continuing to the point designated $n$, that being the point at which pressure in chamber 32 reaches its highest point and the main charge is isolated in chamber 32. Then, in the operation of the engine, between point $n$ and point $o$ the injection charge is kept isolated in the injection charge chamber. At the point $o$ the injection port to chamber 32 again opens and remains open until the point $p$ is reached. During this interval $o$—$p$ the injection charge flows out under its high pressure into the air charge in chamber 32, which at that time is at low pressure, carrying with it the metered quantity of fuel.

Fig. 12 shows the position of the compression piston 15 corresponding to the position $m$ in the diagram, with the valve port 50 just about to register with the stationary injection port 51 which leads to the injection charge chamber 52. At this time the valve is moving in a counter-clockwise direction as indicated by the arrow in Fig. 12. By the time piston 15 has reached its uppermost position (see Fig. 14) port 50 has passed over port 51 and is just out of registration with that port, and communication to chamber 52 is thus cut off. In Fig. 8 the compressor crank 11 is shown in a position corresponding to position $o$ of Fig. 7 and, with the valve then moving in clockwise direction, as indicated by the arrow, port 50 is just beginning to register with port 51; while in the position of Fig. 10, corresponding to the position $p$ of Fig. 7, port 50 has just passed over port 51 and communication is again cut off. During the period intervening between the positions of Figs. 8 and 10 (the period $o$—$p$ of Fig. 7) the fuel charge is entering chamber 32. At the same time the main body of the next charge is being compressed into chamber 32 through port 33. Port 33 will preferably be arranged somewhat tangentially so as to get a more or less violent agitation of the air and fuel in chamber 32. This agitation is also enhanced by the velocity with which the injection charge with its fuel is injected through port 50 into chamber 32. For the most part the fuel charge remains in chamber 32, although the pressure in that chamber and in cylinder 17 is much less than the pressure under which the charge is forced into the chamber. A small amount of fuel may possibly pass down through ports 33 and 22 into the upper part of cylinder 17, but not enough of that charge will thus pass down into the cylinder to create to any marked degree a condition under which the comparatively cool fuel might leak by piston 15 and into the crank case to dilute the crank case lubricant. It will be noted that at the time the fuel charge is injected into chamber 32, the air charge is also being compressed up through ports 21 and 33, this air charge flowing at some velocity upwardly through the ports and thus preventing any movement of the fuel down through those ports to any substantial degree. In the main, if not completely, the injected fuel stays in chamber 32.

Although valve 25 and the walls of chamber 32 are usually hot, due to the combustion taking place in chamber 32, they are not hot enough to cause pre-ignition of the charge. It will be understood that at the time when the comparatively cool fuel is injected into chamber 32 the mixture in that chamber is very rich and cannot be ignited so that any glowing particle of carbon that might be left from the previous combustion is merely cooled off by the comparatively cool charge then being put into the chamber. The charge in that chamber does not reach perfectly combustible proportions until the whole air charge has been compressed into it when piston 15 reaches the upper end of its stroke, and by that time any glowing particle is cool.

Figure 5:
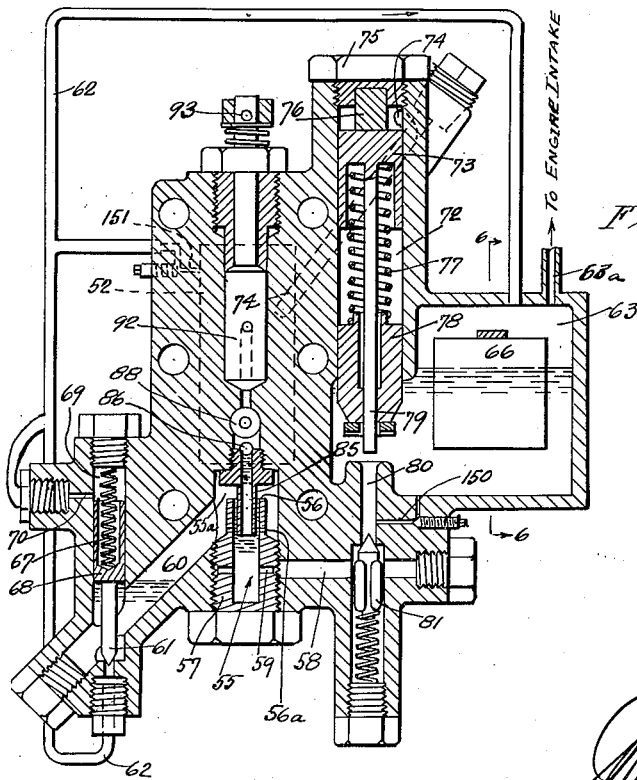
Fig. 5 is a section on line 5—5 of Figs. 4 and 2.
Figure 6:
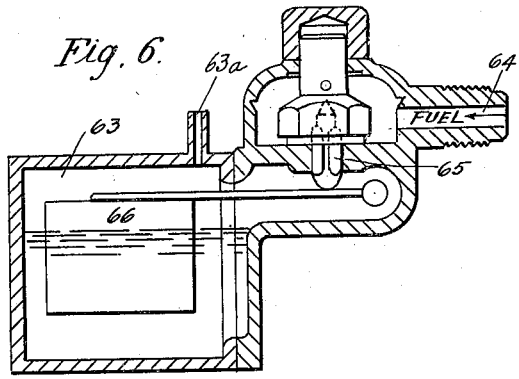
Fig. 6 is a section on line 6—6 of Figs. 2 and 5.

In the design of engine here shown chamber 52 may be conveniently made as a recess in the side of valve chamber 20 and I have so shown it in the drawings. The injection mechanism, designated as a whole by the letter I in Figs. 2 and 3, may be bolted to the side of valve casing 20. Fig. 4 shows in detail the relative arrangement of the injection mechanism and shows some of the details of that mechanism, while Fig. 5 and Fig. 6 show the remainder of its details.

The injection mechanism includes a "limit-level" chamber 55 having an overflow edge 56. I say "limit-level" chamber because its general function is to hold fuel up to a certain limiting level, Typically it is charged with fuel to that limit at or before the beginning of each fuel injecting operation. The level may thereafter fall, or be kept more nearly constant. This chamber may be conveniently formed in a removable plug or bushing 57 and fuel is fed to the chamber through a passage 58 and passages 59. In operation an excess of fuel may be fed to chamber 55, the excess flowing over the edge 56 and thence flowing down through passage 60 and, under control of a valve 61, going out through pipe 62 and thence back to float chamber 63 into which the fuel is fed initially from any suitable supply. Any suitable automatically controlled means may be used for controlling the return of the excess fuel from passage 60 to the float chamber 63. In Fig. 5 I illustrate the valve 61 as being normally pressed down and closed by a spring 67. A small piston 68 connected with valve 61 plays more or less loosely in a bore 69, and above the piston there is a leak port 70 which also communicates with pipe 62. It will be understood from what follows that a considerable air pressure is intermittently present in chamber 55a into which fuel overflows from chamber 55. Under this pressure the fuel which stands in the lower part of passage 60, as shown in Fig. 5, is pressed against piston 68, and a small quantity of air will constantly leak by piston 68 and bleed 70 when the fuel level does not reach the piston. Bleed 70 is small enough to retain sufficient air pressure above the piston to hold valve 61 closed with the aid of spring 67. But when the fuel level in 60 rises to the piston and seals it, the air pressure above the piston falls and the pressure under the piston raises it and valve 61 to release fuel until the level falls sufficiently to allow air again to reach the piston, leak by it, raise the pressure above the piston and close the valve. As a result the valve 61 takes care of any excess fuel that passes over edge 56 of constant level chamber 55, returning that fuel to the float chamber.

I have spoken of "air" pressure in chamber 55a and passage 60. That pressure is in fact a pressure of air and fuel vapor mixture and might more properly be called a gaseous or gas pressure. However, and because the term "gas" is so commonly used to designate gasolene and, therefore, fuel, to avoid confusion in the following description of the injection mechanism, I shall refer to the charge that is put into the injection mechanism as an air charge.

The fuel initially enters at 64 (see Fig. 6) and, under control of valve 65 operated by float 66, stands at a constant level in float chamber 63. The specific mechanism for supplying fuel to chamber 55 may be of various types. Such fuel supply mechanism may be an ordinary pump operated in any suitable manner from the engine mechanism, but in Fig. 5 I show a fuel supply pump that is conveniently incorporated in the structure of the injection mechanism and is conveniently operated by the air pressure which is intermittently present in chamber 52. For instance, there is a bore 72 in which a spring returned piston 73 is adapted to reciprocate, pressure from chamber 52 being introduced above piston 73 through a passage 74. The upper end of bore 72 may be closed by a plug 75 and a stop plug 76 of a suitable material may be inserted in the under side of plug 75 and against which piston 73 may bring up as it reaches the upper end of its spring actuated movement. Spring 77 moves piston 73 up, the spring being seated on a seat member 78 through which the piston operated fuel pumping plunger 79 projects downwardly. The lower end of plunger 79 stands normally in the fuel within float chamber 63; but when it is depressed it passes down into a bore 80 which it fits more or less tightly. At the lower end of this bore is an upwardly closing spring pressed check valve 81 controlling communication with passage 58 hereinbefore spoken of.

When the injection charge under pressure is introduced to chamber 52 that pressure acts upon piston 73 to drive it down, driving plunger 79 down into bore 80 and forcing a certain amount of fuel past valve 81 into passage 58 and thence to the limit-level chamber 55. Although other provisions are made in the mechanism for accurately proportioning the amount of fuel to the amount of air in any given engine charge, and although it is intended to operate the pump plunger so that an excess amount of fuel is always delivered to chamber 55, it will be seen that the pumping actuation of plunger 79 is more or less dependent upon the amount of pressure introduced above piston 73, that pressure of course depending upon the volume of air charge that is being compressed into valve chamber 32. Consequently the amount of overflow fuel to be taken care of will be more or less constant, the plunger pumping less fuel when the air charge is of less volume, and more fuel when the air charge is of larger volume.

From float chamber 63 a vent 63a may be led to the engine intake so that the pressure in chamber 63 may be prevented from rising much above atmospheric and so that the vapor taken off will not go to waste. In Fig. 3 the vent pipe 63a is shown so going back to the engine intake.

The arrangements so far described are seen to have as their ultimate function the supplying of fuel to the limit-level chamber sufficient to raise the level of that fuel up to overflow edge 56. Whether or not the fuel is thus kept up to that overflow edge at all times and during all conditions of operation, depends upon further details which I shall explain hereinafter. For certain purposes it may be desirable to provide small leak ports as at 56a to take fuel away from chamber 55 at a constant rate, thus causing the level of fuel in that chamber to vary with different speeds of engine operation. This will be explained hereinafter. Also it may be desirable to have the fuel pumped into chamber 55 at the same time that fuel is being taken out of it for injection into valve chamber 32, and this will be explained hereinafter. In the specific form of mechanism I am now describing the fuel pumping plunger 79 acts to force fuel into chamber 55 substantially at the time when pressure is first introduced into the injection charge chamber 52—at a time during the period m—n of Fig. 7. But the fuel is not withdrawn from chamber 55 and injected into chamber 32 until the engine reaches the position o in Fig. 7. Consequently in the specific form shown in Fig. 5 the fuel is fed to limit-level chamber 55 and taken out of that chamber at different times. The operation of this form of device will be explained more specifically with such sequences in mind; but other sequences will be explained hereinafter.

Extending down into chamber 55 is a fuel suction tube 85 which may have at its upper end a ball check valve 86. The fuel which is lifted through tube 85 goes into chamber 87. From chamber 87 a fuel nozzle 88 leads out into the charge chamber 52, the discharge end of fuel nozzle 88 being in "injector" relation with a nozzle 89 that forms a part of or is a continuation of port 51. The relationship of nozzles 88 and 89 is such that the flow of the air charge from chamber 52 through nozzle 89 will draw fuel through nozzle 88 at high velocity, the mixture of air charge and fuel being then delivered through ports 51 and 50 at high velocity into chamber 32, the fuel thus being very quickly and forcibly atomized and vaporized both by the great agitation and by the heat in the walls of chamber 32.

The inner end of nozzle 88, the end communicating with chamber 87, is controlled by a needle valve 90. This is the primary control for adjusting the amount of fuel that is carried at each operation through nozzle 88 and through the injection ports into chamber 32. Chamber 87 is also provided with an adjustable pressure bleed communicating with chamber 52; comprising a port 91 communicating with chamber 52 and a ported valve 92 communicating with chamber 87, this valve being adjustable through the medium of a lever or handle or the like 93 at its upper end. This valve may be either operated manually or may be hooked up with the throttle control of the engine or with a speed governor, as is well understood in the art. The function of this adjustable bleed is to allow a certain amount of pressure from chamber 52 to be bled into chamber 87 during the actual movement of the fuel.

There is also a small calibrated bleed port 94 which allows pressure from chamber 55a to bleed out into chamber 52 during the injection action.

The operation is as follows: When valve 25 reaches the position shown in Fig. 4 for charging air or gaseous mixture under pressure into chamber 52, that chamber immediately becomes charged at or near the maximum pressure raised by the compressor piston. That pressure of course flows comparatively freely and immediately into chamber 87 at the upper end of tube 85, flowing both through port 91 and nozzle 88. The pressure in chamber 55a however will not, under ordinary circumstances, build up quite so quickly as in chamber 87, for the port 94 will ordinarily be comparatively restricted—as compared with nozzle 88 and port 91. During this building up of the pressures in the three chambers to the maximum, the function of ball valve 86 is merely to prevent the fuel from being depressed in tube 85 and thereby blown out of chamber 55. If the construction is such that pressure builds up in chambers 87 and 55a simultaneously, there would then be no need of check valve 86; but it would be rather difficult to maintain such a condition in actual operation as the effective cross sectional area of nozzle 88 is adjustable by needle valve 90, and the effective cross-sectional area of port 91 is also adjustable by its valve 92. Consequently, without check valve 86 and with the construction such that with a given adjustment the pressures in chambers 55a and 87 would build up simultaneously, a very slight further adjustment would make the pressure in one or the other of these chambers build up first with the result that fuel would either be blown out of chamber 55 or, if chamber 55a received the pressure first, fuel would be blown up through tube 85. It is therefore preferred to make the construction such that throughout the necessary range of adjustment chamber 87 receives the full pressure first, due to the comparative restriction at 94, and check valve 86 prevents that pressure from blowing the fuel out of chamber 55. And when a check valve is thus used at the upper end of tube 85 the fuel will normally stand in tube 85 up to the check valve.

In the above discussion of the check valve it has been assumed that the limit-level chamber has been filled with fuel before pressure equilibrium obtains between chambers 55a and 87. This, however, may not be the case and the check valve may then be omitted. For instance, the fuel pump may be made to have sufficient inertia to make it slow acting and to be still pumping when pressure equilibrium is reached. And, if the pumping operation takes place at the time fuel is being taken from chamber 55, the check valve is not necessary as the pressures are equalized before the fuel injection starts. This will be touched upon later.

Upon the next subsequent registration of ports 50 and 51 (period o—p of Fig. 7), when the pressure in valve chamber 32 is nearly atmospheric, the pressure in chamber 52 will be suddenly released, resulting in a rush of the injection air charge through ports 51 and 50. Assuming bleed 91 to be properly adjusted, this stream of air at high velocity acts to draw air through nozzle 88, reducing the pressure in chamber 87, thus raising the valve 86 and drawing fuel up through tube 85, that fuel mixing with the air passing through nozzle 88 and thus being drawn out into the stream of air passing through nozzle 89. The fuel thus drawn out is moved at high velocity and is forcibly mixed first with a limited amount of the charge in chamber 87 and in nozzle 88, and is then again forcibly mixed with more of the air charge during the passage through nozzle 89 and ports 51 and 50. This whole stream of mixed air and atomized fuel is then projected at high velocity across chamber 32 through the body of gaseous charge then being compressed in that chamber, striking the opposite wall of chamber 32, becoming heated and vaporized thereby, and becoming thoroughly mixed with the gaseous charge in chamber 32 by virtue of all the agitation due to the movement of the injected stream and also the agitation set up by the flow of gaseous charge then being compressed into chamber 32. The charge in chamber 32 thus becomes thoroughly and uniformly mixed, at first being comparatively rich and then, as more air is compressed into chamber 32, reaching the proper proportions for combustion. It will be understood, of course, that the injection charge compressed into chamber 52 is, after the first cycle of engine operations, a mixture of air with vaporized fuel, because the charge for chamber 52 is taken from chamber 32 at a time when the charge in chamber 32 is substantially completed.

Considering first that the engine is operating at a uniform speed, it will be seen that, with any given adjustment or setting of the several control elements, the amount of fuel drawn through the nozzle 88 depends upon the pressure of the charge in chamber 52, which in turn depends upon the volume (at atmospheric pressure) of charge that is compressed into chamber 32. And the amount of charge compressed into chamber 32 in turn depends upon the amount of air drawn into the compressor cylinder under control of the throttle. Thus the amount of fuel injected into chamber 32 at each fuel injecting operation is generally proportionate to the amount of air being compressed for the charge.

To determine and fix the amount of fuel that is injected for any given amount of air, the bleeds 91 and 94 and the needle adjustment at 90 come into play. At any given speed of engine operation and at any given pressure in chamber 52 the amount of fuel drawn up through tube 85 depends on the difference in pressure between the chamber 87 and chamber 55a. The pressure in chambers 55a and 87 may be considered, at the start of the fuel injecting operation, to be the same as that in chamber 52. The amount of depression in chamber 87 (the amount by which the pressure in chamber 87 is lowered below that in chamber 52) depends primarily upon the relative effective cross-sectional areas of nozzle 88 and the passage 91, the suction, by injector action, through nozzle 88 tending to lower the pressure in chamber 87 and the bleed through port 91 tending to raise that pressure. By proper relative adjustments the amount of depression in chamber 87 may be varied within comparatively wide limits.

As the pressure in chamber 52 falls, decreasing the suction action on nozzle 88, pressure in chamber 55a does not necessarily fall correspondingly. Port 94 being comparatively restricted, retards the fall of pressure in chamber 55a, so that as the injector suction action decreases, and as the pressure in chamber 87 therefore, although absolutely decreasing, approaches more nearly to equality with the pressure in chamber 52, the momentarily sustained pressure in chamber 55a will still tend to force fuel out through tube 85. In other words, although the effectiveness of the injector suction action on chamber 87 is decreasing, that chamber 87 still has a depression relative to the pressure in chamber 55a. The amount and time period extent of this action depend upon the relative restriction of port 94. Both these actions that deliver fuel out of tube 85 are directly responsive to the amount of pressure stored in chamber 52. If the pressure in chamber 52 is higher, the injector suction action on nozzle 88 is greater, drawing more fuel through, and the momentarily stored pressure in chamber 55a is likewise higher and takes longer to equalize itself through restricted port 94, and therefore forces more fuel through tube 85.

The restricted port at 94 may also play a part in controlling the fuel delivery at various engine speeds. At any given pressure in chamber 52 corresponding to any given air charge completed by the engine, a slower rate of operation or engine rotation, all other forces being equal, will deliver more fuel from the atomizer per engine stroke than at some higher speed at the same compression pressure, but with the proper relation between the setting of the bleed port 91, the needle valve 90 and the bleed port 94 of proper size, the longer time allowed for the chamber 55a to discharge through 94 will tend to reduce the amount of fuel delivered in proportion to the time the port 50 is opened.

All the elements of the atomizer combined with the bleed port 94, as a large hole fully open to the chamber 52, would play the part of a carburetor operating under a rapid fall of pressure; that is, similar to an airplane climb at very high speed from a high altitude, and all the velocities involved would fall together, both fuel and air, due to the falling pressure. It may readily be seen that the rate of pressure fall and the extent of the pressure fall will vary considerably with engine speed. At high speed there will not be such a great fall of pressure in chamber 52 as at lower speeds. Therefore, if the needle valve 90 is adjusted relatively small and the port 94 relatively large, and still deliver the amount of fuel desired for various loads at a high constant speed, if then the speed is lowered, remembering all the time that there is plenty of time for the pressures in 52, 55a and 87 to come to equilibrium after 52 has been charged, then during the lower speeds the bleed 94 will have more time to reduce the pressure in the chamber 55a than it will at higher speed, so that at high speeds the excess of pressure in chamber 55a is a large factor in delivering the fuel, while at lower speeds this excess does have time to be relieved by the vent 94. The above relation would come about with a relatively small opening of the needle valve as compared with a relatively large opening of 94 and 91, and will thus tend to correct or partly correct the natural tendency of the operation to deliver a rich mixture at low speed. And, considering all the forces tending to move the fuel, it will be seen that a longer time period will give more opportunity to overcome the full inertia and therefore feed more fuel.

To offset and control further any tendency to deliver proportionately more fuel at slow operating speeds, a purely gravitational operation may be introduced, to comparatively reduce the amount of fuel delivered at slow operating speeds. This last mentioned provision will be one that reduces the amount of fuel proportionately to the time period involved in the cycle of operations; that is, inversely proportional to the speed of the engine operation. The control of proportionate fuel by restricted port 94 is seen to be dependent both upon the volume of the air charge and the time period involved; its function therefore being not strictly dependent upon or wholly controlled by the time period involved. Consequently, with two different controls, each modifying the other in the final result, the amount of fuel delivered under any given conditions of engine operation may be made to be exactly in consonance with the requirements of the engine.

The gravitational means shown in the drawings comprises the small leak ports 56a which simply allow the fuel to pass out of the upper portion of chamber 55 at a measured rate, the total amount of leakage thus being directly proportional to the length of time intervening between the charging of chamber 55 and the time when fuel is withdrawn from that chamber through tube 85. The fuel passing out through leak ports 56a is taken care of the same as the surface overflow of fuel from chamber 55.

And, as hereinbefore indicated, the amount of fuel injected may be controlled in accordance with the speed of operation of the engine by speed control of valve 92. Thus for instance in the drawings I show a governor mechanism at 100 which, through connections 101 operates lever 93 of valve 92. At the same time the governor mechanism, and through it the valve 92, may, if desired, be actuated through connections 102 from throttle 43; so that valve 92 will thus be controlled both in consonance with the throttle control (with the amount of air charge being compressed) and with the speed of engine rotation. Governor mechanisms which give an automatic speed control and at the same time are manually controllable are well known in the ignition and similar arts and so need no specific description here. It is only necessary to state generally that if automatic control is desirable or necessary, in contradistinction to valve 92 being permanently adjusted in any set position, the governor control will operate to somewhat open valve 92 upon decreased speed, while the throttle control will operate somewhat to open the valve upon closing of the throttle.

It will be understood that, when I speak of these controls for proportionately cutting down the amount of fuel that will be injected into the engine when it is running slowly, I do not thereby mean that the engine is thereby made to actually take less fuel in proportion to the volume of air being compressed. Generally speaking an engine running at low speed, whether "lugging" under heavy imposed load, or whether idling, requires a little richer mixture than when running at high speed, or at least those conditions are desirable for sake of economy. However, in an injection device such as herein described the inertia of the fuel may play such a part that at low operating speeds the amount of fuel injected may increase too much, and such controls as I herein describe give perfect and accurate control to obtain a proportionate amount of fuel at different speeds of operation; the other controls which I have described giving accurate control over the amount of fuel introduced in proportion to the volume of air being compressed for a charge.

It will be readily understood that, broadly speaking, any form of suitably actuated fuel pump may be used to deliver fuel to chamber 55, and that by proper timing of the pumping operation, fuel may be delivered to that chamber at any point in the cycle of operations. Fuel may thus be delivered to the chamber 55 at the same time that fuel is being taken out of that chamber. In that case, the pump may be made to exercise a control over the amount of fuel that is taken out by the injection operation because the pump may be so controlled as to its effective capacity under any given circumstances to put fuel into chamber 55 at such a rate as to raise the fuel level initially therein to any selected point, or as to keep the fuel level therein substantially constant during the injection operation, or as to let the fuel level fall or raise by any desired distance during injection operation. Consequently, the control of the pump as to its effective pumping capacity may exercise a control over the amount of fuel injected for each charge, controlled in turn by the amount of air charge and the time factor; pump adjustment and control thus cooperating with the other controls to finally control the amount of fuel injected at each charge in proper proportion to the amount of air in the charge.

And the form of mechanism shown in Figs. 4 and 5 may be adapted to the pumping of fuel to chamber 55 during the period of fuel injection. The fuel pumping plunger 79 is actuated to pump fuel at a time somewhere about the period m—n of Fig. 7. Pressure is admitted to piston 73 at that time. There is naturally a certain lag between the admission of pressure to chamber 52 and the actual pumping stroke of plunger 79; so that the actual pumping stroke may take place, or can, by proper determination of the pump inertia, be made to take place at a point which would be more or less diametrically opposite to the period o—p in the diagram of Fig. 7. Then if, in a two cylinder engine with its pistons connected to opposite cranks, the fuel pump of one injection mechanism is made to supply fuel to the constant level chamber of the other injection mechanism, the same result will be achieved as has been before described with relation to Fig. 7. To facilitate such an arrangement it is only necessary to eliminate passage 58 from the two injection devices so that each pump plunger 79 will cause its fuel to be pumped out through a pipe 125 which will be led into the constant level chamber 55 of the other injection device. Such an arrangement of an injection device is shown in Fig. 16, and Fig. 17 shows diagrammatically the arrangement of a double unit engine in which the cranks 11 and 12 and the cranks 11a and 12a are arranged opposite each other; and this diagram shows the two pipes 125 each connecting up as described.

The control of the pump by time factor will be seen easily to be a matter of pump inertia, so that at higher speeds, with a correspondingly smaller pumping interval, less fuel will be pumped. Also by placing a small controlled leak port at 150 from 80 back to fuel chamber 63, a by-pass is created that will reduce the amount of fuel pumped in proportion to the time of pumping interval and, in the form of pump shown, in proportion to the actuating pressure on the pump piston. The pump here specifically illustrated is one whose time of operation depends on the pressure which actuates it and therefore on the volume of air charge being compressed. The bypass 150 thus becomes a control means by which the proportion of fuel to amount of air charge may be controlled, under control both of time factor and pressure (volume).

Also the amount of fuel pumped and the operation of the injection mechanism as a whole, may be time-controlled by a small adjustable bleed, as shown at 151 (Fig. 5) which leads from injection charge chamber 52 to pipe 62, and thus eventually to the intake. An adjustable bleed at 151 will reduce the pressure in chamber 52 in proportion to the time element involved, and will therefore, in a general way, modify the action of the injector mechanism as a whole, by reducing the air pressure in the whole injector mechanism when the engine speed decreases, thus calling into play all of the pressure controls by reason of the variation of speed. This bleed therefore becomes a means of co-relating the two pressure (volume) controls with the time factor and time controls. Furthermore, such a leak from chamber 52 also relatively reduces the actuating pressure on the fuel pump at a relatively lower speed of operation, thus having somewhat the same control functions as the pump bypass 150.

I have spoken of various controls to take care of the varying fall of pressure in chamber 52 during an injection operation. This fall of pressure, however, may be minimized to a large extent by the proper proportioning of fuel pump cylinder 72, and is largely minimized even in the proportions shown in the drawings. It will be seen that the capacity of cylinder 72 is a substantial proportion of the capacity of chamber 52. Pump spring 77 may be stiff enough to exert a considerable pressure. Consequently, the spring will cause the piston to decrease the effective capacity of the injection charge chamber as the pressure therein falls, and thus keep the pressure more nearly up to its original amount during the injection operation. The amount and extent of this action will readily be seen to depend upon the relative size of the pump cylinder and the strength and action of spring 77. It will of course be recognized that the pump cylinder can be made large enough to hold the major portion or substantially all of the injection charge.

The position of fuel tube 85 with reference to the fuel level in chamber 55 is a matter that may be varied. In the drawings the lower end of this tube is shown in such a position that it will substantially at all times be submerged in the fuel. However, and particularly in the case where check valve 86 is omitted, the tube 85 may be located higher; and its lower end may even be at all times somewhat above the fuel level.

I claim:

1. In combination with an internal combustion engine having mechanism for compressing successive charges; means for isolating a part of a compressed but unfired charge and returning that part to a subsequent charge at the beginning of its compression, and means for supplying fuel to said isolated partial charge exclusively during its return flow to said subsequent charge being compressed.

2. In combination with an internal combustion engine having compressing and valvular mechanism for compressing and expanding successive charges; an injection charge chamber, valve means in structural association with said valve mechanism for isolating a part of a compressed charge in said chamber before beginning expansion of said charge and for returning said isolated part to a subsequent charge being compressed, and means associated with said chamber to feed fuel to the injection charge exclusively during the return flow of said isolated charge to the chamber.

3. In combination with an internal combustion engine having a charge compressing cylinder, a work cylinder, and a chambered valve alternately communicating with the two cylinders to take a compressed charge and transfer it to the work cylinder; an injection charge chamber, valvular means in association with the chambered valve and adapted to connect the valve chamber with the injection charge chamber at a time near the end of a compression stroke and at a time near the beginning of a compression stroke, and fuel feeding means in association with the injection charge chamber.

4. In combination with an internal combustion engine having a charge compressing cylinder, a work cylinder, and a chambered valve alternately communicating with the two cylinders to take a compressed charge and transfer it to the work cylinder; a ported injection charge chamber, said chambered valve having a port adapted to register with the charge chamber port at a time near the end of a compression stroke and at a time near the beginning of a compression stroke, and means whereby the flow of charge through from the ported injection charge chamber draws fuel with it into the valve chamber.

5. The method of operating an internal combustion engine having separate compression and work cylinders, that includes taking a compressed charge from the compression cylinder and isolating the charge from that cylinder, taking off from said isolated compressed charge a portion to become an injection charge, delivering the injection charge with fuel to a subsequent charge when it is at a pressure lower than that at which said injection charge was taken off, compressing and isolating said subsequent charge, transferring it to the work cylinder, firing and expanding.

6. The method of operating an internal combustion engine having separate compression and work cylinders, that includes taking a compressed charge from the compression cylinder and isolating the charge from that cylinder, taking off from said isolated compressed charge a portion to become an injection charge, delivering the injection charge with fuel to a subsequent charge during an early part of its compression, compressing and isolating said subsequent charge, transferring it to the work cylinder, firing and expanding.

7. In an internal combustion engine of the character described, a valve casing, a chambered valve in said casing, an injection charge chamber having a port leading to the valve, the valve having a port adapted intermittently to register with the port of injection charge chamber, an injector nozzle with a delivery end near the port of the injection charge chamber, and means for maintaining a body of fuel near the intake end of said nozzle.

8. In an injection mechanism for an internal combustion engine, a ported injection charge chamber, means to communicate to the chamber port alternately an air charge under high pressure and an air charge under low pressure, thereby alternately to charge said chamber under pressure and to discharge it through said port, and means for supplying fuel to said discharge flow to be drawn with the discharge flow through said port, said last mentioned means comprising a fuel chamber with a limit level overflow edge, means actuated by the pressure in said injection chamber intermittently to supply fuel to said fuel chamber, and means actuated by the discharge flow through said port to draw fuel from said chamber into said port.

9. In an injection mechanism for an internal combustion engine, a ported injection charge chamber, means to communicate to the chamber port alternately an air charge under high pressure and an air charge under low pressure, thereby alternately to charge said chamber under pressure and to discharge it through said port, and means for supplying fuel to said discharge flow to be drawn with the discharge flow through said port, said last mentioned means embodying a primary fuel supply chamber, a limit level fuel chamber, means intermittently to pump fuel from said primary chamber to said limit level chamber in excess, means actuated by the discharge flow through said port to draw fuel from said limit level chamber, and means to return excess of fuel from said limit level chamber to the primary chamber.

10. In an injection mechanism for an internal combustion engine, a ported injection charge chamber, means to communicate to the chamber port alternately an air charge under high pressure and an air charge under low pressure, thereby alternately to charge said chamber under pressure and to discharge it through said port, and means for supplying fuel to said discharge flow to be drawn with the discharge flow through said port, said last mentioned means embodying a primary fuel supply chamber, a limit level fuel chamber, means actuated by the pressure present in the injection charge chamber intermittently to pump fuel from said primary chamber to said limit level chamber in excess, means actuated by the discharge flow through said port to draw fuel from said limit level chamber, and means to return excess of fuel from said limit level chamber to the primary chamber.

11. In an injection mechanism for an internal combustion engine, a ported injection charge chamber, means to communicate to the chamber port alternately an air charge under high pressure and an air charge under low pressure, thereby alternately to charge said chamber under pressure and to discharge it through said port, and means for supplying fuel to said discharge flow to be drawn with the discharge flow through said port, said last mentioned means embodying a primary fuel supply chamber, a limit level fuel chamber, means intermittently to pump fuel from said primary chamber to said limit level chamber in excess, means actuated by the discharge flow through said port to draw fuel from said limit level chamber, and means to return excess of fuel from said limit level chamber to the primary chamber, the limit level chamber having an upper overflow edge and also having a fuel bleed below the overflow edge.

12. In an injection mechanism for an internal combustion engine, a ported injection charge chamber, means to communicate to the chamber port alternately an air charge under high pressure and an air charge under low pressure, thereby alternately to charge said chamber under pressure and to discharge it through said port, and means for supplying fuel to said discharge flow to be drawn with the discharge flow through said port, said last mentioned means embodying a spring returned plunger fuel pump actuated on its pumping stroke by pressure from the injection charge chamber.

13. In an injection mechanism for an internal combustion engine, a ported injection charge chamber, means to communicate to the chamber port alternately an air charge under high pressure and an air charge under low pressure, thereby alternately to charge said chamber under pressure and to discharge it through said port, and means for supplying fuel to said discharge flow to be drawn with the discharge flow through said port, said last mentioned means embodying a spring returned plunger fuel pump actuated on its pumping stroke by pressure from the injection charge chamber, the capacity of the pump cylinder on the pressure side of its plunger being a substantial proportion of the capacity of the injection charge chamber, and the plunger spring moving the plunger on its return stroke to decrease the aggregate capacity of said chamber and cylinder as the pressure therein falls.

14. In an injection mechanism for an internal combustion engine, a ported injection charge chamber, means to communicate to the chamber port alternately an air charge under high pressure and an air charge under low pressure, thereby alternately to charge said chamber under pressure and to discharge it through said port, means for supplying fuel to said discharge flow to be drawn with the discharge flow through said port, and an adjustable pressure bleed leading from the injection charge chamber.

15. In an injection mechanism for an internal combustion engine, a ported injection chamber, means to communicate to the chamber port alternately an air charge under high pressure and an air charge under low pressure, thereby alternately to charge said chamber under pressure and to discharge it through said port, and means for supplying fuel to said discharge flow to be drawn with the discharge flow through said port, said last mentioned means embodying a primary fuel supply chamber, a limit level fuel chamber, means intermittently to pump fuel from said primary chamber to said limit level chamber in excess, said limit level chamber having an upper overflow edge and having a fuel bleed port below said edge, means to return excess fuel from the limit level chamber to the primary fuel chamber, a restricted bleed between the injection charge chamber and the limit level chamber above the fuel therein, a suction chamber, a restricted bleed between the injection charge chamber and the suction chamber, and an injector nozzle leading from the suction chamber to the port of the injection charge chamber.

16. In an injection mechanism for an internal combustion engine, a ported injection chamber, means to communicate to the chamber port alternately an air charge under high pressure and an air charge under low pressure, thereby alternately to charge said chamber under pressure and to discharge it through said port, and means for supplying fuel to said discharge flow to be drawn with the discharge flow through said port, said last mentioned means embodying a primary fuel supply chamber, a limit leved fuel chamber, means intermittently to pump fuel from said primary chamber to said limit level chamber in excess, said limit level chamber having an upper overflow edge and having a fuel bleed port below said edge, means to return excess fuel from the limit level chamber to the primary fuel chamber, a restricted bleed between the injection charge chamber and the limit level chamber above the fuel therein, a suction chamber, a restricted bleed between the injection charge chamber and the suction chamber, an injector nozzle leading from the suction chamber to the port of the injection charge chamber, a restricted pressure bleed leading from the injection charge chamber, and a fuel bleed from said fuel pump to the primary fuel chamber.

17. In a fuel injection device, a pressure holding chamber with an outlet port, an injector nozzle with a discharge end near said port, a suction chamber communicating with the intake end of said nozzle, means to adjustably open and close the intake end of said nozzle, an adjustable bleed between said pressure holding chamber and said suction chamber, a fuel lift tube communicating at its upper end with the suction chamber, a limit level fuel chamber at the lower end of said tube, a restricted bleed between the pressure holding chamber and the limit level chamber above the fuel therein, a primary fuel supply chamber, and means intermittently to pump fuel from the primary fuel chamber to the limit level chamber.

18. In a fuel injection device, a pressure holding chamber with an outlet port, an injector nozzle with a discharge end near said port, a suction chamber communicating with the intake end of said nozzle, means to adjustably open and close the intake end of said nozzle, an adjustable bleed between said pressure holding chamber and said suction chamber, a fuel lift tube communicating at its upper end with the suction chamber, a limit level fuel chamber at the lower end of said tube, a restricted bleed between the pressure holding chamber and the limit level chamber above the fuel therein, a primary fuel supply chamber, and means actuated by pressure from said pressure holding chamber intermittently to pump fuel from the primary fuel chamber to the limit level chamber.

19. In a fuel injection device, a pressure holding chamber with an outlet port, an injector nozzle with a discharge end near said port, a suction chamber communicating with the intake end of said nozzle, means to adjustably open and close the intake end of said nozzle, an adjustable bleed between said pressure holding chamber and said suction chamber, a fuel lift tube communicating at its upper end with the suction chamber, a limit level fuel chamber at the lower end of said tube, a restricted bleed between the pressure holding chamber and the limit level chamber above the fuel therein, a primary fuel supply chamber, means intermittently to pump fuel from the primary fuel chamber to the limit level chamber in excess, and means to return excess fuel from said limit level chamber to said primary fuel chamber.

20. In a fuel injection device, a pressure holding chamber with an outlet port, an injector nozzle with a discharge end near said port, a suction chamber communicating with the intake end of said nozzle, means to adjustably open and close the intake end of said nozzle, an adjustable bleed between said pressure holding chamber and said suction chamber, a fuel lift tube communicating at its upper end with the suction chamber, a limit level fuel chamber at the lower end of said tube, a restricted bleed between the pressure holding chamber and the limit level chamber above the fuel therein, a primary fuel supply chamber, means actuated by pressure from said pressure holding chamber intermittently to pump fuel from the primary fuel chamber to the limit level chamber, the last mentioned means embodying a spring returned plunger pump connected on its pressure side to the pressure holding chamber, the capacity of the pump on its pressure side being a substantial proportion of that of the holding chamber.

21. In an internal combustion engine, the combination comprising, separate compression and work cylinders, means for isolating a compressed charge from the compression cylinder, means for taking off from said isolated compressed charge a portion to become an injection charge, means for delivering the injection charge with fuel to a subsequent charge when it is at a pressure lower than that at which said injection charge was taken off, and means for transferring said subsequent charge to the work cylinder.

22. In an internal combustion engine, the combination comprising, separate compression and work cylinders, means for isolating a compressed charge from the compression cylinder, means for taking off from said isolated compressed charge a portion to become an injection charge, means for delivering the injection charge with fuel to a subsequent charge during an early part of its compression, and means for transferring said subsequent charge to the work cylinder.

23. In an internal combustion engine, the combination comprising, separate compression and work cylinders, means for isolating a compressed charge from the compression cylinder, means for taking off from said isolated compressed charge a portion to become an injection charge, means for delivering the injection charge to a subsequent charge when it is at a pressure lower than that at which said injection charge was taken off, and means for delivering fuel to said injection charge during its return flow to said subsequent charge.

24. An internal combustion engine comprising compressor and work cylinders, a valve controlling both cylinders, said valve containing an alternate clearance between and for the compressor and work cylinders to receive the compressed charge, isolate it and deliver it to the work cylinder, said valve also containing an intake port for the compression cylinder and an exhaust port for the work cylinder; and means for delivering fuel to said alternating clearance in the valve.

25. An internal combustion engine comprising compressor and work cylinders, a valve controlling both cylinders, said valve containing an alternate clearance between and for the compressor and work cylinders to receive the compressed charge isolate it and deliver it to the work cylinder, said valve also containing an intake port for the compression cylinder and an exhaust port for the work cylinder; means for taking off from a compressed charge in said alternating clearance a portion to become an injection charge, means for delivering the injection charge with fuel to a subsequent charge in said clearance, and means for transferring said subsequent charge to the work cylinder.

26. An internal combustion engine comprising an expansible chamber having a movable wall adapted to transmit power, a compressor adapted to compress comburent charges, means adapted to receive within itself and thereby isolate each single compressed charge from said compressor and to open the same to said expansible chamber by the movement of said means, said means also containing intake and exhaust ports for the compressor and expansible chambers, respectively; and means for injecting fuel within said first mentioned means.

In witness that I claim the foregoing I have hereunto subscribed my name this 5 day of January, 1927.

ORVILLE H. ENSIGN.